United States Patent [19]

Matsushita

[11] Patent Number: 4,616,742
[45] Date of Patent: Oct. 14, 1986

[54] SPRING COUPLING FOR AN ELECTROMAGNETIC CLUTCH

[75] Inventor: Takashi Matsushita, Isesaki, Japan

[73] Assignee: Sanden Corporation, Gunma, Japan

[21] Appl. No.: 480,286

[22] Filed: Mar. 30, 1983

[51] Int. Cl.$^4$ .................. F16D 19/00; F16D 27/00
[52] U.S. Cl. .................. 192/84 C; 192/106.1;
474/69; 474/84; 474/101
[58] Field of Search .............. 192/84 C, 106.1, 70.18;
464/69, 77, 84, 100, 101, 160; 267/158, 160,
161; 74/411; 474/94

[56] References Cited

U.S. PATENT DOCUMENTS

| | | | |
|---|---|---|---|
| 1,543,360 | 6/1925 | Bjering | 464/84 |
| 1,863,182 | 6/1932 | Bixby | 192/70.18 |
| 1,896,025 | 1/1933 | Griswold | 192/70.18 |
| 1,975,772 | 10/1934 | Davis | 192/70.18 X |
| 2,630,692 | 3/1953 | Naugler | 464/77 |
| 3,044,594 | 7/1962 | Bernard | 192/84 C |
| 3,082,933 | 3/1963 | Bernard | 417/319 |
| 3,246,485 | 4/1966 | Chapman | 464/77 |
| 3,283,538 | 11/1966 | Trefny | 464/77 |
| 3,489,256 | 1/1970 | Binder et al. | 192/70.18 X |

FOREIGN PATENT DOCUMENTS

| | | | |
|---|---|---|---|
| 210437 | 6/1909 | Fed. Rep. of Germany | 464/84 |
| 2001399 | 7/1971 | Fed. Rep. of Germany | 267/160 |
| 0943109 | 11/1963 | United Kingdom | 464/77 |
| 0473027 | 6/1975 | U.S.S.R. | 464/1 |
| 576453 | 10/1977 | U.S.S.R. | 192/70.18 |

*Primary Examiner*—Lawrence Staab
*Attorney, Agent, or Firm*—Banner, Birch, McKie & Beckett

[57] ABSTRACT

An electromagnetic clutch is disclosed which includes a pulley and an electromagnetic coil. A hub is secured on a drive shaft and has a radially extending flange portion which faces the pulley at a predetermined axial gap. An armature plate is disposed in the axial gap between the pulley and the radially extending flange portion of the hub. The armature plate is elastically connected to the flange portion of the hub by a plurality of spring members. The spring members are provided with a pair of fittings radially opposed to one another at a predetermined radial gap to prevent excessive bending of the spring members during initial operation of the electromagnetic clutch. When the armature plate beings to rotate, each spring member bends to reduce the gap between the pair of radially opposed fittings to thereby absorb the impact force. Therefore, the impact force on the drive shaft when the electromagnetic clutch is first actuated is lessened by the bending of the spring members while, at the same time, over bending of the spring members is prevented by the fittings.

5 Claims, 6 Drawing Figures

SPRING COUPLING FOR AN ELECTROMAGNETIC CLUTCH

BACKGROUND OF THE INVENTION

This invention relates generally to electromagnetic clutches, such as for use in controlling the transmission of power from an automobile engine to a refrigerant compressor in an automobile air conditioning refrigerating system, and more particularly, to an improved connecting structure between an armature plate and a hub mounted on a compressor shaft for transferring the rotation of a pulley to the compressor shaft.

The general structure of an electromagnetic clutch for use between an automobile engine and refrigerant compressor is disclosed in U.S. Pat. Nos. 3,044,594 and 3,082,933. The electromagnetic clutch disclosed in these patents, which is illustrated in FIGS. 1-2 of the annexed drawings, comprises pulley 1 rotatably supported on a tubular extension of a compressor housing through bearing 2. The pulley is rotated by a belt coupled to the automobile engine. Pulley 1 is made from a magnetic material in which one or more concentric arcuate or annular slits 3 are formed to define a plurality of concentric annular magnetic poles. Drive shaft 4 extends through a tubular extension in the compressor housing and hub 5 is fixed to the terminal end of the drive shaft. Annular armature plate 6, which is concentric with hub 5 at an annular radial gap, is joined to hub 5 by a plurality of leaf springs 7 so that armature plate 6 faces the annular concentric poles of pulley 1 at a predetermined axial air gap. One end of each leaf spring 7 is secured on the axial end surface of hub 5, together with stopper plate 9, by rivet 10 and the other end is secured on the axial end surface of armature plate 6 by rivet 11. Magnetic coil 8 is mounted on the tubular extension of the housing to generate magnetic flux to attract armature plate 6 to the magnetic poles. Thus, when magnetic coil 8 is energized and the engine is driving pulley 1, drive shaft 4 rotates together with pulley 1. However, when magnetic coil 8 is not energized, even though pulley 1 is rotated by the engine, drive shaft 4 of the compressor is not driven.

In the above prior art construction, armature plate 6 is joined to hub 5 by a plurality of leaf springs 7 and hub 5 is fixed to drive shaft 4. At the moment when armature plate 6 first begins to rotate in response to the magnetic forces generated by pulley 1 and magnetic coil 8, an impact force occurs. This impact force is the result of the sudden initiation of rotational movement of the armature plate because of its magnetic coupling to the rotating pulley. However, since this impact force is not cushioned by the rigid connection of the leaf springs between the armature plate and the drive shaft, a sudden torque is transmitted to the drive shaft of the compressor.

In order to avoid the application of a sudden torque to the drive shaft, it also is conventional to form each of the leaf springs in the shape of an arc to absorb the impact force by bending the arc-shaped leaf springs 7', as shown in FIG. 3. However, since the arc-shaped leaf springs 7' have limited elasticity, the endurance or useful life of the leaf springs is inferior to conventional straight leaf springs. Furthermore, the arc-shaped leaf springs are disposed at an angular offset to be drawn or pulled generally along their lengthwise dimension in the direction of the rotation (in the figures, the direction of rotation is shown by arrows). If the clutch is rotated in a direction opposite to the normal direction of rotation, shearing stress occurs in the leaf spring. As a result, the useful life of the clutch is reduced.

SUMMARY OF THE INVENTION

It is the primary object of this invention to improve the useful life of an electromagnetic clutch by providing an improved spring member which is connected between the armature plate and a radial flange mounted on a hub which is in turn mounted on the rotatable shaft.

It is another object of this invention to provide an electromagnetic clutch which has a mechanism for lessening the impact force transmitted to the drive shaft upon initiation of rotational movement of the drive shaft.

It is still another object of this invention to accomplish the above objects with an electromagnetic clutch of simple construction.

An electromagnetic clutch according to this invention includes a first rotatable member having an axial end plate of magnetic material and a second rotatable member. The second rotatable member includes a rotatable shaft, a hub mounted on the end of the shaft and a radially extending flange portion mounted on the hub which faces the axial end plate of the first rotatable member at a predetermined axial gap. An annular armature plate is disposed in the axial gap between the first rotatable member and the flange portion mounted on the hub. The armature plate faces the axial end plate of the first rotatable member with an axial air gap therebetween. An electromagnetic coil is disposed within the first rotatable member for attracting the armature plate to the axial end plate of the first rotatable member. The armature plate is elastically connected with the flange portion of the second rotatable member by a plurality of leaf springs. Each leaf spring is provided with a pair of fittings at each end thereof. The pair of fittings for each leaf spring are opposed to one another to limit the relative rotation range of the armature to the first rotatable member. Accordingly, excessive bending of the leaf springs is prevented by the contact of the pair of fittings due to rotation of the armature plate.

Further objects, features and other aspects of this invention will be understood from the following detailed description of the preferred embodiments of this invention referring to the annexed drawings.

DETAILED DESCRIPTION OF THE PREFERRED EMBODIMENTS

Figure 1:
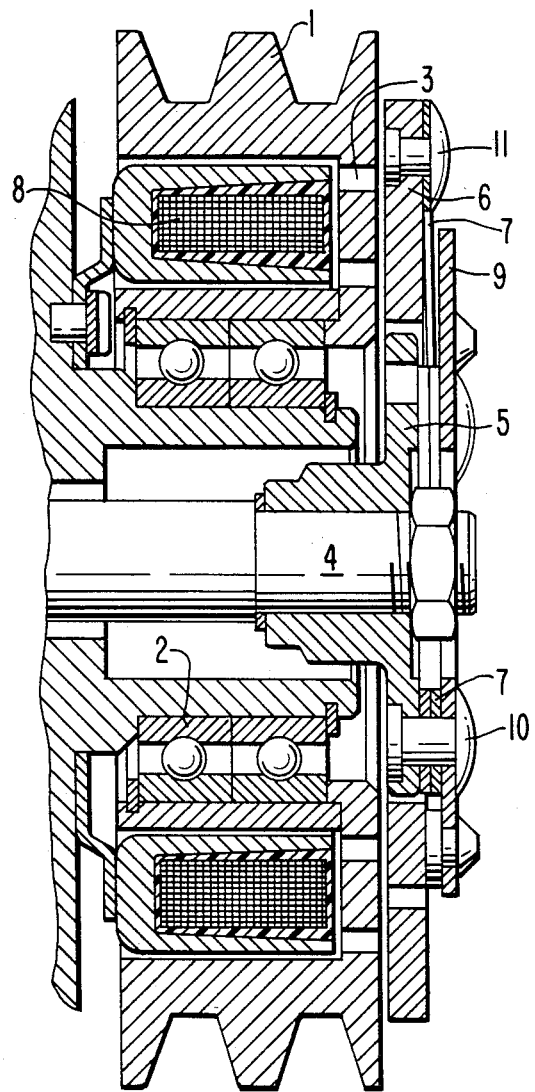
FIG. 1 is a vertical sectional view taken along the line I—I in FIG. 2.
Figure 2:
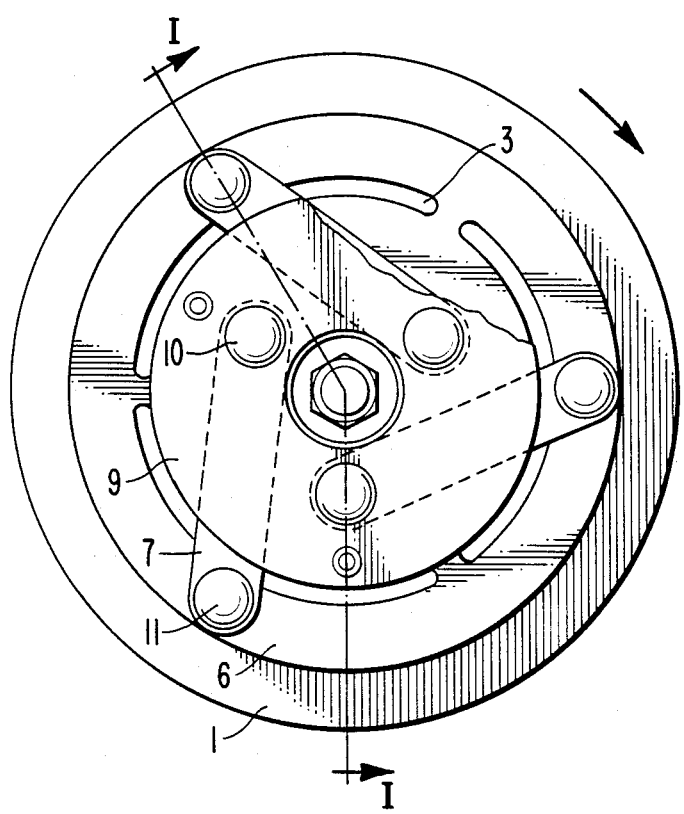
FIG. 2 is a front view of a conventional electromagnetic clutch.
Figure 3:
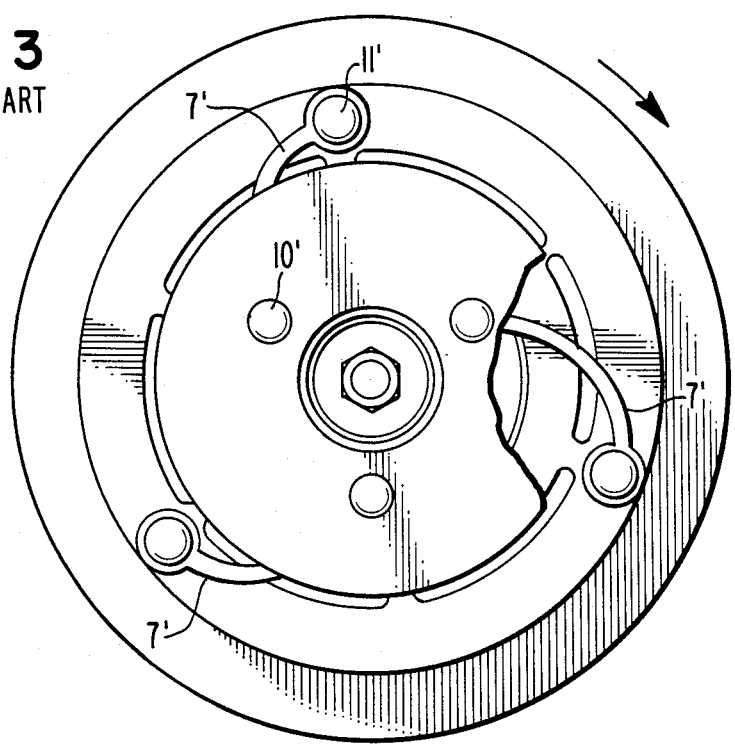
FIG. 3 is a front view of another conventional electromagnetic clutch.
Figure 4:
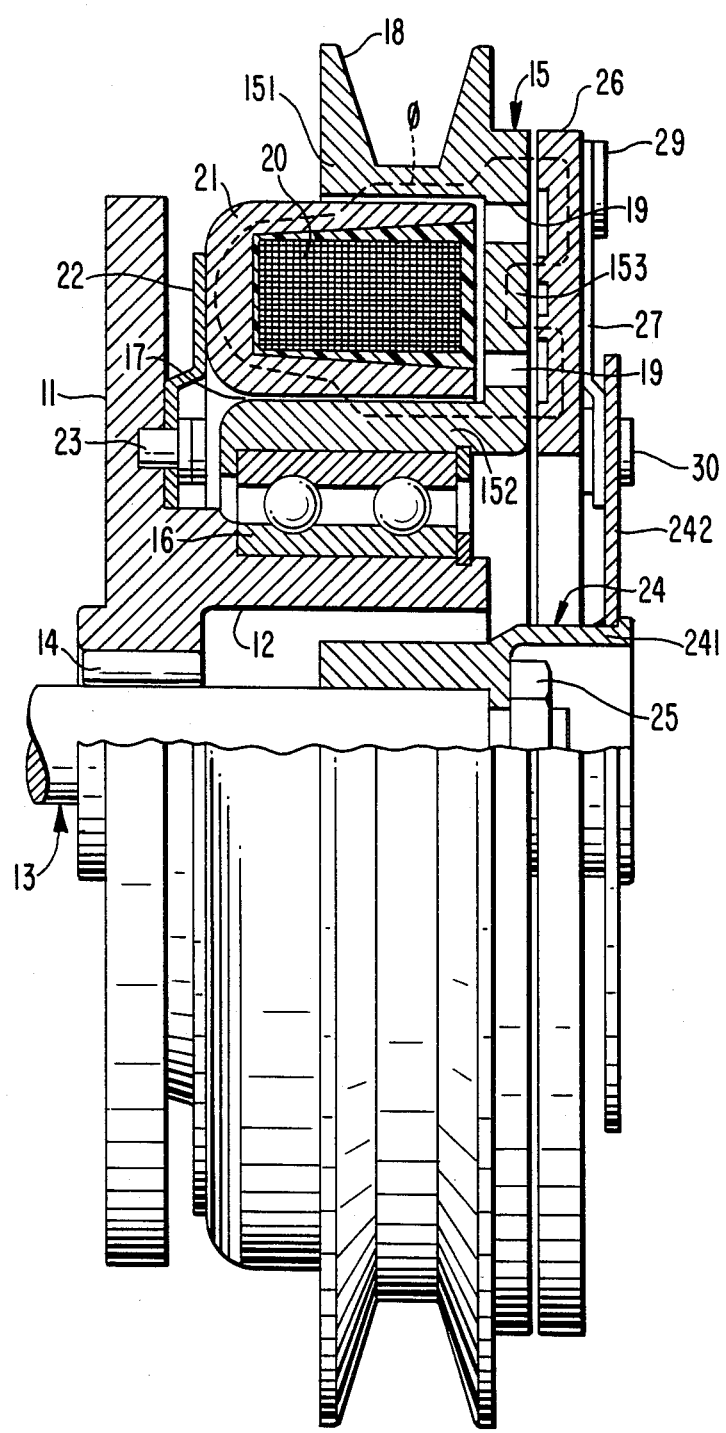
FIG. 4 is a vertical sectional view of an electromagnetic clutch according to one embodiment of this invention.
Figure 6:
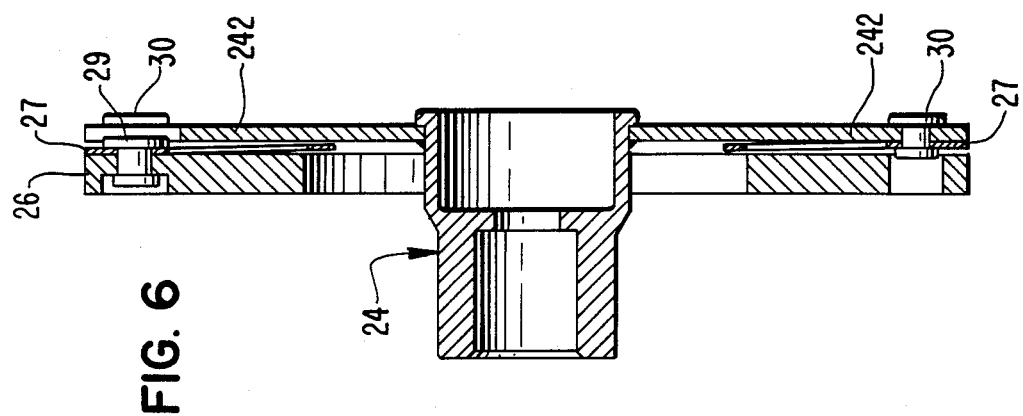
FIG. 6 is a cross-sectional view taken along the line IV—IV in FIG. 3.
Figure 5:
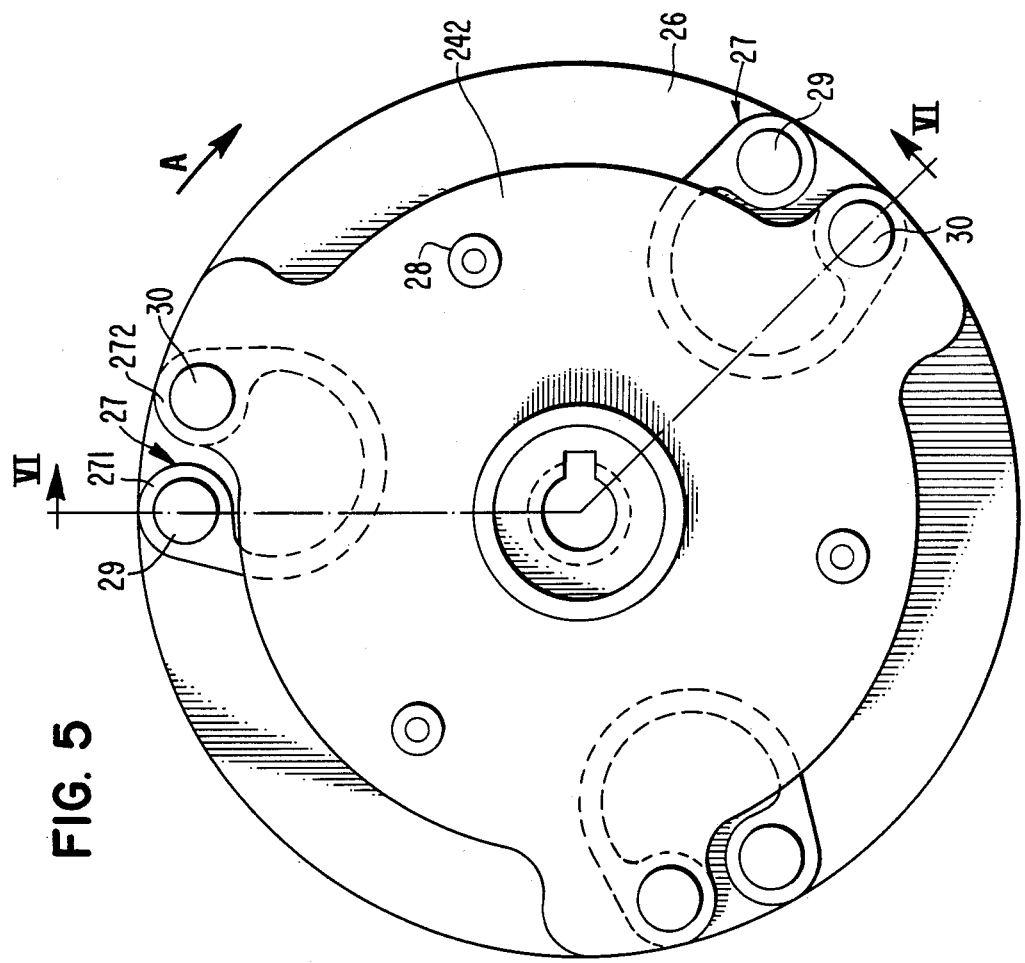
FIG. 5 is a front end view of the electromagnetic clutch shown in FIG. 2.

Referring to FIGS. 4-6, an electromagnetic clutch according to an embodiment of this invention is assembled to a refrigerant compressor for an automobile air conditioner. Compressor housing 11 is provided with cantilevered tubular extension 12 surrounding an extension of drive shaft 13 of the compressor. Drive shaft 13 is rotatably supported in the compressor housing 11 by bearing 14.

Pulley 15 is rotatably supported on tubular extension 12 through bearing 16 which is mounted on the outer surface of tubular extension 12. Pulley 15 is made of magnetic material, such as steel, and comprises outer annular cylindrical portion 151, inner annular cylindrical portion 152 and axial end plate portion 153 connecting the outer and inner cylindrical portions 151 and 152 at an axial forward end. Annular U-shaped cavity 17 is defined between the portions 151, 152 and 153 and annular V-shaped groove 18 is provided on the outer peripheral surface of outer cylindrical portion 151 of pulley 15 for receiving a V-belt for coupling the compressor to the output shaft of the automobile engine (not shown).

Axial end plate portion 153 includes one or more concentric slits 19 which are disposed on one or more concentric circles. These slits 19 define a plurality of annular or arcuate magnetic pieces with the surface of the poles being on the axial end surface of axial end plate portion 153.

Electromagnetic coil 20 is disposed in annular cavity 17 of pulley 15. Coil 20 is contained within annular magnetic housing 21 having a U-shaped cross section. Housing 21 is fixed to a supporting plate 22, which is secured to the axial end surface of compressor housing 11 by a plurality of rivets 23, one of which is shown in FIG. 4. Coil housing 21 is maintained within cavity 17 out of contact with pulley 15 because of a small gap between them.

Hub 24 is disposed on a terminal end of drive shaft 13 within the housing. Hub 24 is secured to drive shaft 13 by nut 25. The hub comprises tubular member 241 secured on the terminal end of drive shaft 13 and radial flange portion 242 extending radially outwardly from the axial end portion of tubular member 241. Radial flange portion 242 of hub 24 faces the axial end plate portion 153 of pulley 15 at a predetermined axial gap. As shown in FIGS. 4 and 6 flange portion 242 is formed separately from tubular member 241 and is fixed on tubular member 241 by welding. Alternatively, the flange portion may be formed integral with the tubular member.

A ring plate or armature plate 26, which is concentric with hub 24, is disposed in the axial gap between end plate portion 153 of pulley 15 and flange portion 242. Armature plate 26, which faces the axial end plate portion 153 of pulley 15 at a predetermined axial gap, is elastically connected to flange portion 242 of hub 24 through a plurality of spring members 27.

As shown in FIG. 5, each spring member 27 has a U-shaped configuration and both end portions are opposed to one another. Spring member 27 is provided with a pair of fittings 271 and 272 at each end portion thereof, and one end portion is secured to the axial end surface of armature plate 26 by rivet 29 and the other end portion is secured to flange portion 242 of hub 24 by rivet 30.

Flange portion 242 is provided with a plurality of projections 28 on its axial end surface to push armature plate 26 toward axial end plate portion 153 of pulley 15 to provide an initial deformation or bias to spring members 27. This defines the predetermined axial air gap between pulley 15 and armature plate 26.

In the above construction, if coil 20 is not energized, armature plate 26 is separated from pulley 15 by the recoil strength of spring members 27 which maintains a predetermined air gap. When coil 20 is not energized, only pulley 15 is driven by the engine of the automobile through the V-belt, and the compressor is not operated. On the other hand, when coil 20 is energized, magnetic flux ($\phi$) is induced and flows as indicated by the dotted line shown in FIG. 4 through a closed loop comprising coil housing 21, pulley 15, armature plate 26, pulley 15 and coil housing 21. Armature plate 26 is magnetically attracted to pulley 15 by the magnetic flux which is caused by the energization of coil 20, and spring member 27 is bent in the axial direction. Therefore, the rotating movement of the automobile engine is transmitted to drive shaft 13 of the compressor through pulley 15, armature plate 26, spring members 27 and hub 24.

At the moment armature plate 26 contacts axial end plate portion 153 of pulley 15, spring members 27 receive the impact force caused by the torque of armature plate 26. This impact force is lessened by the deformation of spring members 27 in the direction of rotating movement of armature plate 26, since, at the moment armature plate 26 contacts pulley 15, armature plate 26 moves in the same direction of rotation as pulley 15; however, hub 24 does not rotate initially. Spring members 27, which connect hub 24 and armature plate 26, are bent by the initial rotating motion of armature plate 26. This bending of spring members 27 continues until the rotating motion is gradually transferred to hub 24. Thus, torque change which is transmitted to drive shaft 13 through hub 24 is lessened by the deformation of spring members 27.

The relative angular rotation between armature plate 26 and flange portion 242 of hub 24, which occurs at the early stage of rotating motion of armature plate 26, is limited by the positioning of fittings 271 and 272 of spring members 27 opposite each other. If over bending of the spring members 27 occurs, which is caused by relative angular rotation between armature plate 26 and flange portion 242, fittings 271 and 272 of spring member 27 contact each other to prevent further bending. Therefore, over bending of the spring members in the direction of rotating movement of the armature plate is prevented and the necessary bending strength of the spring members is reduced.

According to this invention, the impact force which is transmitted to shaft 13 of the compressor through pulley 15 is lessened principally by deformation of spring members 27 which are connected between armature plate 26 and flange portion 242 of hub 24. Also, excessive deformation of spring members 27 is prevented by the fittings of spring members 27 to thereby prevent fatigue and fracture of the spring members.

This invention has been described in detail in connection with the preferred embodiments, but the preferred embodiments are an example only and this invention is not restricted thereto. It will be easily understood by those skilled in the art that other variations and modifications can be easily made within the scope of the invention.

I claim:

1. In an electromagnetic clutch including a first rotatable member having an axial end plate of magnetic material, a second rotatable member, an annular armature plate of magnetic material joined to said second rotatable member so that said annular armature plate is capable of limited axial movement, said annular armature plate facing said axial end plate of said first rotatable member with an axial air gap therebetween, and an electromagnetic means associated with said axial end plate for attracting said armature plate to said axial end plate so that rotation of said first rotatable member can be transmitted to said second rotatable member through said armature plate by the operation of said electromagnetic means, the improvement comprising:

said second rotatable member including a drive shaft, a hub fastened to the end of said drive shaft and a radially extending flange mounted on said hub;

a plurality of spring members coupling said annular armature plate to said radially extending flange, each of said spring members having first fitting means coupling said spring member to said annular armature plate and second fitting means coupling said spring member to said radially extending flange, said first and second fitting means being positioned opposite each other at a predetermined gap for preventing excessive bending of said spring members when the predetermined gap is closed by the initial rotation of said annular armature plate in response to the operation of said electromagnetic means and said first rotatable member, said excessive bending being prevented by said first and second fitting means contacting each other.

2. The electromagnetic clutch of claim 1 wherein said spring members are U-shaped.

3. The electromagnetic clutch of claim 2 wherein said first and second fitting means are formed on the outer terminal ends of said spring members.

4. The electromagnetic clutch of claim 1 wherein said first and second fitting means of each of said spring members are radially opposed to each other at a predetermined radial gap.

5. The electromagnetic clutch of claim 1 wherein said plurality of spring members all flex in substantially the same direction with respect to each other when the predetermined gap is closed by the initial rotation of said annular armature plate.

* * * * *